Sept. 16, 1930.   D. L. MIDDENDORF   1,775,965
APPARATUS FOR SHAPING ARTICLES OF GLASS
Filed Nov. 26, 1926   2 Sheets-Sheet 2
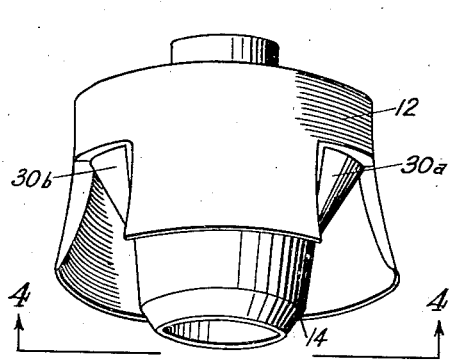
Fig. 3
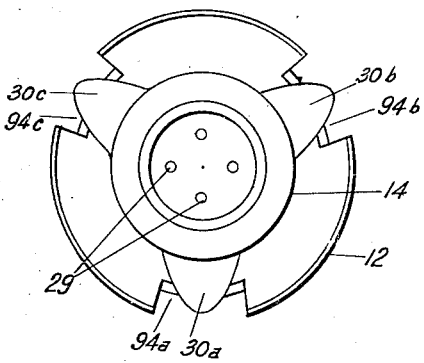
Fig. 4
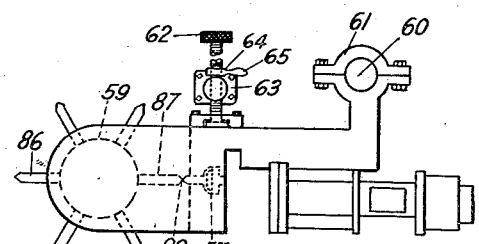
Fig. 5
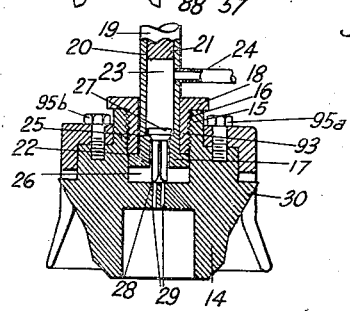
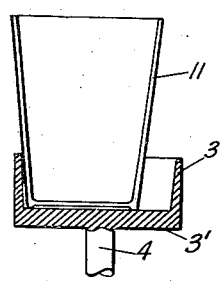
Fig. 7
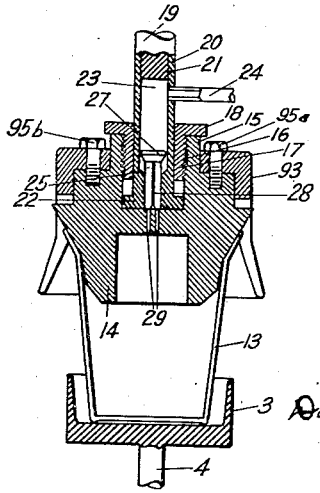
Fig. 6
Fig. 8
David L. Middendorf
INVENTOR.
BY Edwin P. Corbett
ATTORNEY Patented Sept. 16, 1930

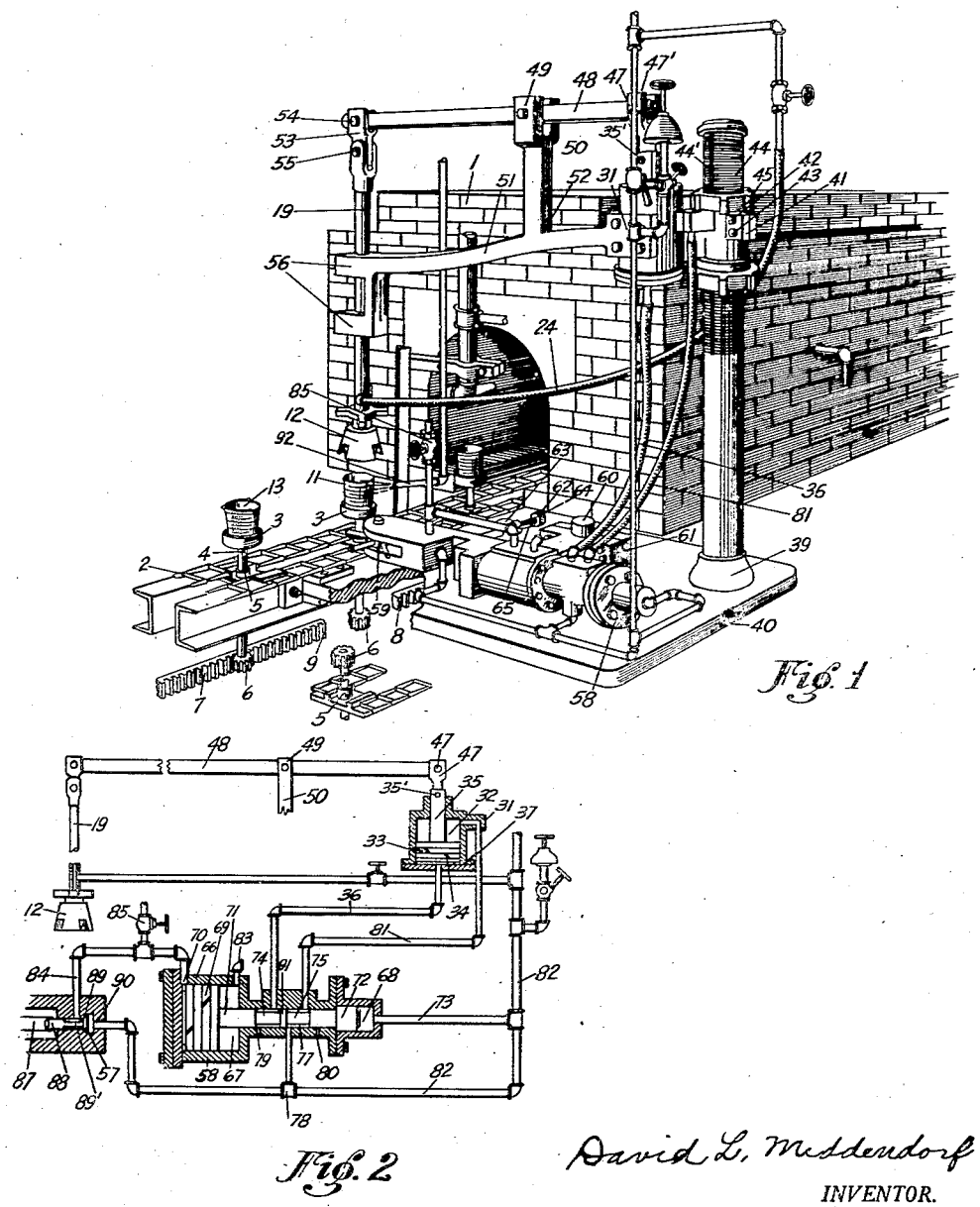

1,775,965

UNITED STATES PATENT OFFICE

DAVID L. MIDDENDORF, OF COLUMBUS, OHIO, ASSIGNOR TO THE FEDERAL GLASS COMPANY, OF COLUMBUS, OHIO, A CORPORATION OF OHIO

APPARATUS FOR SHAPING ARTICLES OF GLASS

Application filed November 26, 1926. Serial No. 150,837.

My invention relates to apparatus for shaping articles of glass and, more particularly, to method and apparatus for shaping measuring cups, dishes, vases and other similar glass articles.

Heretofore, it has been customary to shape these measuring cups or similar glass articles by the hand method, and attempts may have been made to accomplish such shaping by both automatic and semi-automatic methods.

Apparently, the hand method has been the most successful method, up to the present time, of forming the lips of measuring cups or similarly shaping glass articles. The hand method comprises the forming of a straight-sided tumbler by pressing or blowing, or by any other method known in the art, such straight-sided tumbler being commonly called a blank. After the blank is formed, it is then reheated in any desired manner, such as in a glory hole, and the shaping is then effected by rotating the blank and shaping the cup or other article with a suitably provided buffer or paddle. The hand method requires much time and manipulation and, at its best, is unsatisfactory because the product resulting therefrom is not uniform in shape or thickness, since uniformity must depend upon the eye of the workman. This is a very detrimental aspect when viewed from the commercial standpoint, since the graduated cups or other articles could not be depended upon for accuracy in measurement. Also, the hand method necessitates the use of highly skilled labor and very slow working, with a resultant slow production which makes the production of this type of glass articles by the hand method exceedingly expensive.

Furthermore, it has not been found practicable to make lipped or similarly shaped articles by automatic or semi-automatic methods because no means has as yet been devised for ensuring uniformity of product and, because in all instances, it has been found that, due to the plastic condition of the glass, the cup or other article tends to lose its shape which makes the lipped measuring cups and other articles produced by such means and methods unfit for commercial use.

One of the objects of my invention is to provide an automatic method and means for forming lips on measuring cups or similar glass articles whereby uniformity of product is effected and ensured.

Another object of my invention is to eliminate the use of skilled workmen and increase production whereby the cost of production is greatly reduced.

Still another object of my invention is to provide an automatic means for forming lips on measuring cups or similar glass articles whereby defects heretofore prevalent in automatic or semi-automatic methods are overcome, resulting in a commercially successful product.

Other and further objects of my invention will be obvious by referring to the specification following and to the drawings attached hereto and made a part hereof and herein.

The preferred embodiment of my invention is shown in the accompanying drawings wherein similar characters of reference designate corresponding parts and wherein Figure 1 is a perspective view of an apparatus employing my invention, with part of the supporting table broken away to show the operation of the rack and pinion mechanism under the conveyer.

Figure 2 is a diagram of the fluid operating means of my device, partly in section, to illustrate the action of the valves and cylinders.

Figure 3 is a perspective view of the lip forming device showing the means whereby the blank is maintained in its original shape.

Figure 4 is a bottom plan view of the lip forming device.

Figure 5 shows a plan view of the lower bracket supporting the star valve and air cylinders as well as the lateral adjustment for said bracket.

Figure 6 is a fragmentary side elevation of a vertical standard and clamping means for supporting the main air cylinder and connecting mechanism.

Figure 7 is a detailed sectional view of the lip shaping device in position above the blank and before it has moved down upon the blank.

Figure 8 is a detailed sectional view of the lip shaping device in shaping position on the blank.

In carrying out my invention, it is first necessary for the article to be partially shaped into what is commonly called a blank, this partial shaping being accomplished by pressing or blowing in a mold or by any other well known or applied means.

In shaping glassware, such as measuring cups, dishes, vases or other similar glass articles, in accordance with my method and with my apparatus I provide a suitable heating chamber to which the articles to be shaped are to be transferred. After the blank has been passed through the heating chamber and has been heated to the proper temperature and is in the desired plastic shape, a shaping means is caused to move upon the said plastic blank and forms the same to the desired shape. This action is accomplished automatically and without human intervention.

In the shaping of certain kinds of ware, I provide means for supporting and shaping the internal walls of the blank. This is done so that no deformation will take place during the shaping of the blank. To accomplish this, when desired, I provide means for automatically supplying fluid pressure to the interior of the glass blank being shaped, this action being effected simultaneously with the shaping of the tumbler. In effecting this, I provide, with my shaping means and for the operation of the same, suitably provided valves and operating mechanism, as shown in the hereto annexed drawings.

Referring particularly to the drawings, the numeral 1 represents a heating chamber having a blank conveyor 2 passing through the same. In the drawings, this conveyor 2 is seen conveying blanks from the outlet side of the heating chamber. This conveyor 2 may be of any desired construction and may be moved in any desired manner to suit the preference of the user. The heating chamber 1 is heated to such a degree that the glass blank which has passed therethrough will be sufficiently plastic to permit the desired shaping.

Arranged at intervals upon the carrier 2 (see Figure 1) are blank supports, each of which comprises a seat portion 3, a stem 4, and a plate 5 having a hole drilled therethrough through which the stem 4 projects. The opposite end of the stem 4 projecting through the plate 5 has mounted thereon a pinion 6 which meshes with the rack 7. This pinion 6 meshing with the rack 7 causes each blank support to revolve as the conveyor transports the pinion in contact with the rack.

When the pinion 6 on the stem 4 reaches the point 8, where the rack 7 is broken away, it ceases to revolve until it reaches the point 9 where it again meshes with the rack 7 causing the blank support and the blank therein to revolve again. The revolving of the blank is highly desirable so that the glass blank may be uniformly heated on all sides in its passage through the heating chamber 1. Otherwise, one side of the blank might become more plastic than the other side, so that, when the blank comes under the shaping means, there would be a likelihood of the blank crinkling on one side, causing such a distortion in the finished article as to make it unsalable. It has been found desirable, however, to cease the revolving movement of the blank support when it arrives beneath the shaping means 12 because, if the blank support were revolved at this point, it tends to cause the tumbler thereon to revolve and move away from beneath the center of the shaping means 12, thus causing the shaping means to strike the blank 11 in off-center position and distort it.

The numerals 10 and 11 represent glass blanks in place in their resective seat portions 3 on the carrier 2. The blank may be removed from the blank forming apparatus and placed as shown by any suitable means. The blank 10 is shown at a position just as it emerges from the heating chamber 1. The blank 11 is shown in position underneath the shaping head 12 and before the shaping head 12 has acted thereon. The numeral 13 represents a blank in position in its respective support 3 on the carrier 2 after it has been shaped and moved beyond the shaping head 12.

In effecting shaping of a blank, I employ an automatically reciprocating shaping head 12 with a diverging center portion 14 which is adapted to be pressed down into the glass blank and shape it by wedging pressure applied, and a bell-shaped outer portion 93 which is adapted to hold the top of the blank in its circular shape. This outer portion is equipped with slots 94$^a$, 94$^b$ and 94$^c$ for the reception of the lip forming elements 30$^a$, 30$^b$ and 30$^c$ and is rigidly attached to the inner portion 14 by means of the bolts 95$^a$ and 95$^b$. The angle of inclination of the outer surface of 14 and the inner surface of 93 may be varied to effect the desired amount of divergence or other shaping which may vary under different conditions of use.

Integrally formed therewith and extending upwardly from the shaping head 12, is a collar portion 15 (see Figures 7 and 8). This collar portion 15 is internally threaded as at 16 and a sleeve 17 is adapted to be screwed into it. It will be noted that, by referring to Figures 7 and 8 of the drawings, the sleeve 17 has a flange 18 at its upper end, said flange being adapted to seat upon the top of the collar 15, and the flange 18 is wide enough to overhang the external wall of the said collar 15.

The shaping head 12 may be detachably secured to a reciprocable stem 19, the means for reciprocating the stem 19 being hereafter more fully described. In detachably securing the shaping head 12 to the stem 19, there is preferably employed a detachable hollow coupling 20, the upper end of which is secured to the stem 19 by the threaded portion 21. The extreme lower external portion of the coupling 20 terminates in a flange 22. In attaching the shaping head 12 to the stem 19, I first secure the coupling 20 with the sleeve 17 thereon to the stem 19 at the threaded portion 21. I then place the lower end of the flanged portion 22 of the coupling 20 inside of the collar portion 15, after which I screw the sleeve 17 into place in the collar 15 until the flange 18 of the same seats upon the top of the collar 15. It will be noted that the sleeve 17, when screwed into place, does not contact at all times with the flange 22 of the coupling 20, but, instead, permits a slight reciprocation of the flange portion 22. The reason for this will be explained hereafter.

When the hollow coupling 20 is secured in place as desired, an air chamber 23 is formed to which is connected a constant supply of fluid pressure, preferably air, through the pipe 24. The air may be supplied to the pipe 24 from any suitable source and at any desired pressure, as necessitated by the conditions of use.

The lower end of the chamber 23 is reduced in diameter and shaped to form a valve seat 25, which terminates in a reduced opening 26. Contained within the chamber 23 at its lower part is a valve 27 which is adapted to seat upon the valve seat 25. The valve 27 has a triangular shaped stem 28, as shown in Figures 7 and 8, which extends through and is guided into the opening 26 in such a way that air will readily flow past it when the valve 27 is raised from its seat.

At or near the center of the bottom of the diverging inner portion of the shaping head 12 and within the collar portion 15, are four air passages 29 which communicate with the opening 26 in the bottom of the coupling 20. It will be noted that the flange 22 of the coupling 20 is adapted, in its lowermost position, to seat upon the diverging portion 14 of the head 12. It will be further noted that the end of the valve stem 28 is of a reduced diameter so as to fit loosely in the reduced opening 26 of the coupling 20 so that it will permit air to flow freely around it when the valve 27 is unseated.

In operation of these parts, when the shaping head 12 is moved to contact with the glass blank 11, a collapsing movement between the shaping head 12 and the coupling 20 takes place, that is, the diverging inside portion of the shaping head 12 will first contact with the top of the blank 11 and the stem 19 will continue to move downwardly until the flange 22 of the coupling 20 contacts with the top of the diverging inside portion of the shaping head 12. The stem 19 continues to move downwardly and the diverging inside portion of the shaping head 12 is wedged down into the blank, thereby shaping the contacting portion of the blank to approximately the shape of the surface of the diverging inside portion 14 of the shaping head 12.

When the flange portion 22 of the coupling 20 seats upon the internal diverging portion as described, a sufficiently tight joint is formed at such contacting point to prevent the escape of air past the same and up and around the coupling 20.

When the shaping head 12 contacts with the glass blank 11 and the stem 19, and the coupling 20 continues to move downwardly, (see Figure 8) the stem 28 of the valve 27 is moved so as to unseat the valve 27, permitting air pressure to flow from the chamber 23, past the valve 27, in and around the valve stem 28, and through the passages 29, and, consequently, to the interior of the blank 11, which is being shaped. By this action, sufficient air pressure is admitted to and acts upon the interior wall of the glass blank 11 to more or less counterbalance the pressure of the shaping head 12 upon the blank, whereby the interior wall of the blank 11 is shaped and supported uniformly so that no crinkling or other deformation of the internal surface of the glass blank occurs during the shaping period. After the shaping period, the air serves to push the blank away from the shaping head.

When the head 12 has shaped the blank 11, it is moved away therefrom by lifting the stem 19, thus lifting the shaping head 12 out of contact with the shaped blank. The upward movement of the stem 19 causes the coupling 20 to rise until its flanged portion 22 contacts with the lower part of the sleeve 17, freeing the end of the valve stem 28 from contact with the head 12 causing the valve 27 by its own weight plus the air pressure in the chamber 23 to seat and remain seated, and thus shutting off the admission of air to the head 12.

I provide a cylinder and piston structure (see Figure 2) for controlling the movement of the stem 19. The upper cylinder and piston structure is adjustably carried in a casing 31 on a vertical standard 38. At its lower end, the standard 38 has a collar 39 thereon. Below this collar 39, the standard 38 extends through an opening in the plate 40 and is secured to said plate 40 from underneath thereof by means of a large nut (not shown).

The casing 31 of the upper piston structure is mounted upon the standard 38 by the split collar 41 (shown in Figures 1 and 6) and may be fastened to the desired position by tightening the bolts 42 and 43. It will be noted that this standard 38 is threaded at its upper position as at 44. Above and below the split collar 41, are large adjusting nuts 45 and 46. It is obvious that the clamping means 41 and connected mechanism may be raised or lowered on the standard 38 by screwing the adjusting nuts 45 and 46 up or down as may be desired. This mechanism clamped on the standard 38 is prevented from rotating around said standard by a key (not shown) fitted in the keyway 44'. When the clamp 41 and connected mechanism has been positioned in its proper place, the bolts 42 and 43 are tightened and the large nuts 45 and 46 are tightened on the standard 38 so as to hold the said clamp 41 and connected mechanism rigidly on the standard 38 and prevent vibration.

The upper cylinder structure may comprise a casing 31 containing a piston chamber 32 within which operates a piston 33. The larger face of this piston 33 has a small projection 34 which prevents the said face of the piston 33 from seating against the cylinder head in its lowermost position in order to ensure that the air pressure, when applied, will become immediately effective on the entire piston face and cause the piston to move upwardly quickly. Piston rings are provided in the piston 33 so as to prevent leakage of air from one side to the other. Connected to and moved by the piston 33 is a piston rod 35, which is of comparatively large size and serves to produce a reduced area of the upper piston face in comparison with the area of the lower piston face. The piston face carrying the stem 35 and opposite the one having the projection 34 will hereinafter be termed the smaller piston face. The stem 35 extends up through and is guided by the casing collar, the proper seal against leakage at this point being preferably provided by rings.

Suitably connected to the casing 31 and leading to the chamber beneath the large face of the piston 33, is a pipe 36 to which air pressure is admitted and exhausted; and leading to the chamber above the smaller piston face is a pipe 81 to which air pressure is admitted and exhausted, as will be hereinafter described. The upward movement of the piston 33 is effected when pressure is admitted beneath the large face of the piston 33. The pressure acting on the smaller piston face is exhausted and downward movement is effected when pressure is admitted to the smaller face of the piston 33, pressure on the large piston face being allowed to exhaust.

The piston stem 35 terminates in a reduced portion which has a bifurcated end with drilled holes therein for the insertion of the bolt 35'. Attached and pivoted to the bifurcated end of the piston stem 35 by the bolt 35', is the upper bifurcated member 47' which is in turn pivoted to the lever 48 by the bolt 47. The lever 48 is fulcrumed at 49 to a support 50. This support 50 is rigidly secured to an arm 51 at 52, and this arm 51 is, itself, in turn rigidly secured, as shown in Figure 1, to the casing 31.

The opposite end of the lever 48 is pivoted to bifurcated member 53 by a bolt 54. This bifurcated member 53 is pivoted to the upper bifurcated end of the stem 19 by a bolt 55. The stem 19 is slidably held and guided in true alignment with the glass article 11 by the guides 56 on the arm 51. This arm 51, it will be noted, is rigidly secured to the casing 31. Therefore, it is obvious that, as the piston 33 moves up and down, a similar motion is imparted to the stem 19 and, consequently, to the shaping head 12 through the medium of the lever 48.

It will be noted that the piston casing 31, support 50 and guides 56 are secured and carried together as a single unit. Therefore, the adjustment of the casing 31 on the standard 38, as hereinbefore described, likewise adjusts the support 50 and the guide arm 51. Adjustment of these parts is provided to take care of any variation in the position of the glass blank upon the carrier 2 or any variation in the shape and height of the glass blank as well as the speed with which the glass blank is carried to the heating chamber. Also, by this unit construction, the apparatus as a whole may be easily set up or taken down and transferred from one place to another.

I have shown my invention as employed in connection with a continuously moving carrier 2 and it is, therefore, necessary that the shaping head be moved upon and away from the blank at proper intervals and in a minimum length of time while the blank is beneath the shaping head, otherwise distortion of the blank may take place. To control this, I employ the lower valve and piston structure shown in Figures 1 and 2, which act in conjunction with the upper piston and cylinder structure, above described.

Obviously, my invention is not limited in application to a continuously moving blank but may be employed where the motion of the blank is stopped or arrested during the "lip forming" operation. The mechanism for controlling the downward movement of the shaping head 12 comprises the star wheel 130

59, the control valve 57, and the lower cylinder 58, the whole being rigidly mounted on a vertical standard 60 by the split clamp 61, as shown in Figures 1 and 5.

The actuating mechanism is laterally adjustable about said standard 60 by means of an adjustment screw 62 (see Figures 1 and 5). This adjustment screw is threaded and extends through a vertical standard 65 which is swiveled and internally threaded to receive the threaded adjustment screw 62. It will be obvious that, by means of this adjustment screw 62, the actuating mechanism may be laterally adjusted about the vertical standard 63 to which it is pivoted. When the proper adjustment has been made, the actuating mechanism may be locked in position by the lock nut 64 having a handle 65; this holds the cup actuating mechanism in a rigid position and provides means for its adjustment so that it may be adjusted with relation to the blank supports on the carrier 2 so that the spokes of the star wheel 59 will either contact with the stem 4 of the blank support nearer the outlet of the furnace or further away from said outlet, as may be desired, The double cylinder 58 comprises a casing 66 having a large cylinder chamber 67 and a small cylinder chamber 68. The large cylinder chamber 67 has a piston 69 which operates therein. The large face of this piston 69 has a small projection 70 thereon which prevents the said face of the piston 69 from sealing against the cylinder head in its forward stroke so that the air pressure, when applied, will become effective immediately on the entire piston face and cause the piston to move backward quickly. The piston rings are provided in the piston 69 so as to prevent leakage of air from one side to the other.

Connected to and moved by the piston 69 is a stem 71 which is of a comparatively large size and which serves to produce a reduced area of the piston face in comparison with the area of the large piston face. The piston face carrying the stem 71 and opposite the one having the projection 70 will be hereinafter termed the smaller piston face.

The stem 71 extends through the casing 66, which is reduced in diameter between the large and the smaller cylinder chambers, the valve stem 71 reciprocating therein. At its opposite end, the stem 71 coacts with the small piston 72 in the small cylinder chamber 68. The stem 71, which extends through and is guided in and by the cylinder casing connecting the chamber for the small piston 72 with the chamber for the large piston 69, is reduced in diameter at 74 and 75 so that around such reduced portions 74 and 75 are formed small annular cavities 76 and 77, respectively. Connected to the lower side of this reduced portion of the casing 66 between the large cylinder chamber 67 and the small cylinder chamber 68, is the pipe 78, communicating with the interior thereof. The lower side of the reduced portion of the casing 66 also has atmospheric vents 79 and 80. On its upper side, the reduced portion of casing 66 has pipes 36 and 81 connected thereto, and communicating with the interior of said casing.

It will be noted that the pipe 78 communicating with the interior of the cylinder casing at its reduced portion is also connected with the constant air pressure pipe 82. The pipe 36 connected to the upper side of the reduced portion of the cylinder casing is connected to the piston chamber 32 of the upper cylinder structure beneath the large face of the piston 33, while the pipe 81 leading from said reduced portion of the casing 66 is connected to and communicates with the cylinder chamber 32 of the upper cylinder structure above the small face of the piston 33.

The large cylinder chamber 67 has an atmospheric vent 83 to allow the escape of any air that may be on the side of the small face of the piston 66 when it is compressed against the cylinder head. Leading into the cylinder chamber 67 on the large face of the piston 69, is the pipe 84. This pipe 84 extends into and communicates with the control valve 57. The air pressure from valve 57 to the pipe 84 to the large face of the piston 66 is regulated by a needle valve 85.

The action causing the downward movement of the shaping head 12 in my device is brought about by the stem 4 on the blank support coming in contact with one of the outer spokes 86 of the star wheel 59 and causing the opposite inner spoke 87 of the star wheel 59 to contact with the protruding stem 88 of the valve 57. The valve 57 normally seats in the valve seat 89 and is held in this position by constant air pressure from the pipe 82. The valve stem 88, it will be noted, is slightly reduced in diameter as at 89; and it will also be noted that the pipe 84 communicates with the valve stem 88 at its reduced portion 89, even when the valve 57 is unseated.

The operation of the snap-action mechanism comprising the upper and lower cylinder structures will now be described:

In the position shown in Figure 2, constant air flows through pipe 82 through pipe 73 to the interior of the small cylinder chamber 68, causing the piston 72 through the stem 71 to force the large piston 69 against the cylinder head, air pressure in the large face of piston 69 escaping through pipe 84 and valve 85. Constant air also flows through pipe 82 and pipe 78 to the cavity 77 around the reduced portion of the stem 75 to the pipe 81 and into the piston chamber 32, causing the small cylinder face of the piston 33 to force the piston 33 to its lowermost position, air pressure on the large face of piston 33 exhausting through pipe 36 in and around the reduced portion 74 of the stem 71 through the vent 79 to the atmosphere.

Constant air pressure also flows through the pipe 82 into the small valve cavity 90, holding the valve 57 on its seat 89. With the valves and pistons in this position, it will be noted that the piston stem 35, the arm 48 and stem 19 will hold the shaping head 12 in its uppermost position out of contact with the blank 11.

However, when the blank 11 on the carrier support 3 moving on the conveyer 2 contacts by its stem 4 with the outside spoke 86 of the star wheel 59, this causes the opposite inner spoke 87 of said star wheel 59 to contact with the projecting end of the stem 88 of the valve 57. As the star wheel revolves, the inner spoke 87 thereof presses against the projecting end of the stem 88 of the valve 57 forcing said valve stem 88 inward and, thus, unseating the valve 57 so that constant air on the face of the valve 57 is allowed to pass around the valve 57 into the small cavity surrounding the reduced portion of the valve stem as at 89' and into the pipe 84. The air through the pipe 84 will, of course, enter cylinder chamber 67.

When pressure is admitted to the large face of the piston 69, the pressure acting upon the large face of this piston 69 overcomes the pressure upon the face of the small piston 72 in cylinder chamber 68 and the piston 72 is moved against the cylinder head having the constant air pipe 73 therein. Any air on the small face of the piston 69 in the cylinder chamber 67 will exhaust through the atmospheric vent 83. As the pressure upon the large piston face 69 overcomes the pressure on the face of the small piston 72, the piston stem 71 is moved toward the smaller piston chamber 68 and, in doing so, the tight-fitting portion of the stem 71 is moved over so that it covers the atmospheric vent 79, while the reduced portion 91 of the stem 71 moves over so that it communicates with the constant air pipe 78 and is still in communication with the pipe 36 on the upper side of the casing. The tight-fitting portion 91 between the reduced portions 74 and 75 of the stem 71 moves beyond the opening of the pipe 78 in the casing 66 so that the constant air from pipe 78 is shut off from the small cavity 77 around the reduced portion of the stem 71.

As the stem moves toward the small cylinder chamber 68, the atmospheric vent 80 in the casing which has heretofore been closed by the tight-fitting portion of the stem 71 between the reduced portion 75 and the valve 72 is uncovered as the reduced portion 75 of the stem 71 moves thereon, so that there is direct communication between the cylinder chamber 32 on the small face of piston 33 through the pipe 81, around the reduced portion 75 of the stem 71 to the atmosphere through vent 80. It will, thus, be obvious that air pressure on the small face of piston 33 will exhaust through the pipe 81 into and around the reduced portion 75 of the stem 71 and out through the atmospheric vent 80.

Air from pipe 82 will flow through pipe 78 in and around the reduced portion 74 of the stem 71 which is now directly over the opening of the constant air pipe 78 into the cylinder casing 66 through pipe 36 to the large face of piston 33. This will cause the piston 33 to move upward so that the piston stem 35, pivoted at 47 to the lever 48 and fulcrumed at 49, will cause the stem 19 carrying the shaping head 12 to move downward and contact with the blank 11.

As the blank support 3 is continuously moving, the stem 4 thereof soon passes out of contact with the outer spoke 86 of the star wheel 59 so that the opposite inner spoke 87, having moved the projecting stem 88 inwardly so as to unseat the valve, passes beyond the projecting stem 88, releasing it, and the constant air pressure from pipe 82 pressing against the face of the valve 57 thereupon seats valve 57, cutting off the air connection with the pipe 84 and the large face of the piston 69. At the same time, constant air pressure from pipe 82 through pipe 73 and pressing on the face of the small cylinder 72 will, therefore, cause the cylinder 72 to move inwardly and to push the large piston 69 against the cylinder head. The air on the large face of piston 69 will exhaust through the pipe 84 and through the needle valve 85 to the atmosphere.

As the small piston 72 moves the piston 69 toward its cylinder head, the valve stem 71 will move into the position shown in Figure 2 of the drawings so that the atmospheric vent 79 is uncovered and the tight-fitting portion 91 of the valve stem 71 moves over to the left of the constant air pipe 78 shutting off the small cavity 76 around the reduced portion 74 of the stem 71 from the constant air supply while the reduced portion 75 of the stem 71 is again in communication with the opening of the constant air pipe 78. It will, thus, be obvious that the air on the large face of the piston 33 will exhaust through the pipe 36 in and around the reduced portion 74 of the stem 71 to the atmosphere through the atmospheric vent 79, whereas the constant air pressure through the pipe 82 and pipe 78 will flow into the cavity 77 around the reduced portion 75 of the stem 71 into the pipe 81 and so as to press on the small face of the piston 33. This will, of course, cause the piston 33 and its stem 35 connected to the lever 48 fulcrumed at 49 to move downward, causing the stem 19 carrying the shaping head 12 to move upward and out of contact with the blank 11, which has now been shaped as shown by the numeral 13 of Figure 1.

It will be understood that, by regulating this needle valve, the length of time the shaping head 12 rests upon or contacts with the blank 11 may be controlled. It is obvious that, if this needle valve is so regulated, so that air pressure on the large face of piston 69 is slow in exhausting, this will prevent the constant air pressure on the small piston 72 from acting quickly against the pressure on the large face of piston 69, and this will allow some time to elapse before the reduced portion 74 of the piston stem 71 slides out of communication with the constant air pipe 78 and into communication with the exhaust vent 79; and some time to elapse before the reduced portion 75 of the piston stem 71 slides over to close the exhaust vent 80 and before it comes into communication with the constant air pipe 78, so as to allow pressure to be exhausted from the large face of piston 33 and applied on the small face thereof. During this interval, the stem 35 will be in its raised stroke so that the lever 48 connected thereto will hold the shaping head 12 on the stem 19 in contact with the blank. The more the needle valve is opened, however, the quicker will be the exhaust of air from the large face of piston 69 and, consequently, the quicker the sliding movement of the piston stem 71 which, in turn, will cause the air pressure to be exhausted from the large face of piston 33 more quickly and will cause the air pressure to be applied more quickly to the small face of piston 33, so as to cause a quicker downward movement of piston 33 and stem 35 and, consequently, a quicker movement of lever 48, lifting the stem 19 and the shaping head 12.

Therefore, by means of this needle valve 85, the length of time the shaping head 12 contacts with the blank 11 may be very easily controlled so as to make the period of contact of long or brief duration, as may be desired.

It will be understood that, as the shaping head moves downward over the blank 11, constant air pressure is constantly admitted to the blank 11 through the pipe 24 into the diverging inner portion 14 of the shaping head 12 for the purposes hereinbefore described of counteracting the pressure of the shaping head 12 and preventing the interior of the articles from becoming distorted. It will be understood, however, that, in making some kinds of ware, the use of the internal shaping means may be dispensed with.

At the completion of this operation, the blank has been properly shaped and the shaping apparatus is in position for again making the cycle just described. It will, of course, be understood that this movement of the shaping head 12 downwardly onto the blank 11 is, almost, instantaneously performed.

The speed of this operation may be regulated through the medium of the needle valve 85 so as to cause the air cylinder above described to act more quickly or more slowly, as may be desired.

The finger of air from the pipe 92 which is connected to constant air pressure has a very important part in that it causes the blank 11 to slide over the smooth bottom surface of the support 3. It is, also, important to note that this bottom surface of the support 3 has been treated with graphite as at 3' to reduce the friction in the sliding of the blank over against the forward side of the blank support 3. Then, when the downward movement of the shaping head 12 is effected, by means of the snap-acting mechanism controlled by the star wheel 59, this blank 11 will be in perfect alignment with the shaping head 12 and, when the shaping head 12 momentarily holds the blank, the graphite coating will allow the blank to slide on the blank support which is always moving forward.

It will be understood that an asbestos shield or other adequate means may be employed at the ends of the heating chamber to maintain the heat therein as well as to protect my apparatus from heat. Such shielding may, of course, be so shaped as to permit entrance of the blanks carried by the carrier 2.

Also, I have shown my invention as applied, particularly, to the forming of measuring cups, but it is obvious to those skilled in the art that it may be equally well applied to such glass articles as dishes, vases or other similar glass articles.

It will be obvious that I have provided an apparatus for shaping glass blanks to final form wherein these blanks are automatically presented at regular intervals to a shaping mechanism, which automatically effects the shaping operation without cessation of movement of the article conveyor. This shaping mechanism is operated in such timed relation to the successively presented blanks that it will contact uniformly with the blank at the proper time. Various adjustments have been provided which make it possible to ensure the proper relative timing movements of the blanks and the shaping mechanism. Adjustments have also been provided to compensate for variations in form of the blanks to be shaped.

The mechanism is such that the blanks may be rotated under subjection to heat prior to and immediately after the shaping operation. This rotation under subjection to the heat results in a uniform heating which is important in the attainment of a uniform shaping, for, if one side of the blank is more plastic than the other, this side is likely to be crinkled or otherwise distorted.

In further explanation of the feature of compensating for the time period during which the blank is held by the shaping head, while the conveyer moves on, the following may be said:

Due to the fact that the cup supporting the blank through the heating chamber is, in many instances, of much greater diameter than the article cnotained therein, and which of course, has to be made in this manner to accommodate various glass blanks of different diameters and to allow the blank room to slide across the bottom of the blank support as it continuously moves forward while the top of the blank is momentarily held by the shaping head, it frequently happened that the glass article in this supporting cup, having a certain amount of play, would not always be centered properly under the external shaping means and, consequently, the external shaping means, striking the cup off-center, would thereby cause a distortion so as to make the article unsalable. Then, as the conveyer is always continuously moving forward, the blank support has to be made of sufficient diameter so as to allow the blank to slide across the bottom surface thereof while the head of the blank is held momentarily under the shaping head 12 without the blank contacting with the rear side of the blank support. In other words, in addition to being centered properly under the shaping head 12, the blank should not be against the rear side of the blank support when the shaping head comes down to shape the blank, for the reason that, if the blank is so positioned when the shaping head contacts therewith and momentarily holds the blank in fixed position, there is not sufficient room on the blank support between the blank and the edge of the blank support to allow for the forward movement of the blank support without its contacting with the blank being momentarily held in a fixed position by the external shaping head. This will either cause the blank to be pulled away from the shaping head and, thus, distorting it or will cause the blank to be toppled out of the blank support.

To overcome this difficulty, it was found desirable to find means for automatically centering the glass blank, with relation to the external shaping means, on the blank support and to allow the blank on said blank support sufficient room so that, when the blank support underneath thereof moved forward with the conveyer, the blank would not contact with the sides of the said blank support before it had been released by the shaping head.

This is accomplished by directing a blast or finger of air at the blank on the blank support as it passes a certain point on the conveyer and immediately before the blank support and the blank thereon has come into position under the external shaping means. This blast or finger of air causes the blank on the blank support to be blown against the forward side of said blank support. The blank, of course, being against the forward side of the blank support, which support is of greater diameter than the blank thereon, the said blank support, therefore, has sufficient room to move forward before the bottom of said blank contacts with the side of the said blank support while the top of said blank is being momentarily held by the shaping head, and before the shaping head's hold thereon has been released.

In order to facilitate the blowing of the blank against the forward side of the blank support so that it would always be properly centered below the external shaping means, it has been found desirable to coat the interior surface of the bottom of the blank support with a mixture of grease and graphite. This grease and graphite hardens and forms a very smooth surface on the bottom interior of the blank support across which the hot glass blank will readily slide when the blast or finger of air strikes the sides thereof or when the top of the blank is momentarily being held by the external shaping means and the blank support is moving forward with the conveyer. Without the interior coating on the bottom of the cup, the hot blank would stick in one place and would not slide on the bottom interior of the blank support.

It will be seen that I have provided a novel and simple device for automatically reshaping the upper edge of the glass blank in order to produce pouring lips therein. The shaping head is of such peculiar form that these lips are produced very effectively while, at the same time, the intermediate portions of the receptacles are braced against distortion.

Having thus described my invention, what I claim is:

1. Apparatus for shaping glass articles comprising a heating chamber, means for conveying such glass articles through a heating zone while rotating the articles, means for forming lips upon the said heated articles, and means for discontinuing rotation during shaping.

2. Apparatus for shaping glass articles comprising a heating chamber, means for conveying such glass articles through a heating zone while rotating the articles, means for forming lips upon the said heated articles, means for discontinuing rotation during shaping, and means for introducing a shaping medium into said article during the shaping action.

3. Apparatus for shaping glass articles comprising a heating chamber, means for conveying such glass articles through a heating zone while rotating the articles, means for forming lips upon the said heated articles, means for discontinuing rotation during shaping and means for automatically positioning the articles upon said conveyer as they approach said shaping element.

4. Apparatus for shaping glass articles comprising a shaping head having a central core with glass distorting ribs formed thereon and a surrounding skirt with cutaway portions opposite said ribs, such ribs extending through said cutaway portions, means for automatically and successively presenting the glass articles to said shaping head, and means for automatically bringing said shaping head and each article into forming contact.

In testimony whereof I hereby affix my signature.

DAVID L. MIDDENDORF.